United States Patent
Rodriguez, Jr.

Patent Number: 5,285,961
Date of Patent: Feb. 15, 1994

[54] THERMOSTAT CONTROL SYSTEM

[76] Inventor: Jose A. Rodriguez, Jr., 5800 Castle Ct., Fredericksburg, Va. 22407

[21] Appl. No.: 16,279

[22] Filed: Feb. 11, 1993

[51] Int. Cl.$^5$ .......................................... G05D 23/00
[52] U.S. Cl. ..................................... 236/47; 165/11.1
[58] Field of Search .............. 236/47, 46 R; 165/11.1

[56] References Cited

U.S. PATENT DOCUMENTS

| | | | |
|---|---|---|---|
| 4,060,123 | 11/1977 | Hoffman et al. | 236/47 X |
| 4,223,831 | 9/1980 | Szarka | 236/47 |
| 4,462,540 | 7/1984 | Dytch | 236/47 |
| 4,623,969 | 11/1986 | Bensoussan | 236/47 X |

*Primary Examiner*—William E. Wayner
*Attorney, Agent, or Firm*—S. Michael Bender

[57] ABSTRACT

The present invention relates to a means for preventing unnecessary expense in operation of a heating, ventilation and air conditioning system (HVAC) especially in areas wherein occupancy may be sporadic and where the occupants of such areas may not be personally concerned with keeping the expense of running such systems at a minimum. To accomplish this the present invention provides for at least two thermostatic controls within such area, one of such controls having fixed limits for the ambient temperature within the area while the other has variable limits therefor. The fixed limit control is locked and only accessible for adjustment by authorized personnel having the key to such lock. The variable limit control is actuated to override the fixed limit control through the operation of relay switches initiated by an infrared motion sensor unit positioned within such area. When motion is detected by such unit, it causes switches to be thrown cutting out the fixed limit control and bringing the variable limit control on line. A timer is connected to keep the variable limit control operable for such time as may be considered reasonable or desirable whereupon at the expiration of such time, operation will revert back to the fixed limit control.

4 Claims, 2 Drawing Sheets

THERMOSTAT CONTROL SYSTEM

BACKGROUND OF THE INVENTION

1. Field of the Invention

The present invention relates to thermostatic controls and more particularly pertains to such controls which may be especially useful in rental property.

2. Description of the Prior Art

The use of thermostatic controls is well known in the prior art. More specifically, such controls heretofore devised and utilized for the purpose of controlling temperatures in rental units are known to consist basically of familiar, expected and obvious structural configurations, notwithstanding the myriad of designs encompassed by the crowded prior art which have been developed for the fulfillment of countless objectives and requirements. Examples of prior art devices and their usage include U.S. Pat. Nos. 4,897,798; 5,038,851; 4,141,497; and 4,886,110.

One of the problems with providing thermostatic control of heating, cooling or ventilation is the human element involved. The use may well forget or not bother to change the setting from an extreme to a reasonable one when vacating the premises involved with such control either permanently or for an extended period of time. This is particularly a problem with rental units such as motels, condos, or the like. Considerable unnecessary expense is generated for the owner, operator, or landlord of such units.

In this respect, the thermostatic control system according to the present invention substantially departs from the conventional concepts and designs of the prior art, and in so doing provides an apparatus primarily developed for the purpose of economical usage of temperature control.

Therefore, it can be appreciated that there exists a continuing need for new and improved systems which can be used to create economy in usage. In this regard, the present invention substantially fulfills this need.

SUMMARY OF THE INVENTION

In view of the foregoing disadvantages inherent in the known types of thermostatic control now present in the prior art, the present invention provides an improved system. As such, the general purpose of the present invention, which will be described subsequently in greater detail, is to provide a new and improved thermostatic control system and method which has all the advantages of the prior art and none of the disadvantages.

To attain this, the present invention positions at least two thermostatic controls within the area for which regulation is desired. Such controls consist of two types - one having preset fixed limits for heating and/or cooling and the other having variable limits for such parameters. The units are interconnected so that one type only will be operative at any given time. The variable limit unit is activated by a motion sensor, preferably of the infrared type known to the art. When it activates, a relay switch cuts the fixed limit thermostat out of the control loop for a predetermined interval of time. After such time, assuming no further motion is detected, the fixed limit unit is reactivated and takes over control from the variable limit thermostat, thereby keeping the ambient temperature within the economical limits preset on such fixed limit unit.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved thermostatic control system which has all the advantages of the prior art systems and none of the disadvantages.

It is another object of the present invention to provide a new and improved thermostatic control system which may be easily and efficiently manufactured and marketed.

It is a further object of the present invention to provide a new and improved thermostatic control system which is of a durable and reliable construction.

An even further object of the present invention is to provide a new and improved thermostatic control system which is susceptible of a low cost of manufacture with regard to both materials and labor, and which accordingly is then susceptible of low prices of sale to the consuming public, thereby making such systems economically available to the buying public.

Still yet another object of the present invention is to provide a new and improved thermostatic control system which provides in the apparatuses and methods of the prior art some of the advantages thereof, while simultaneously overcoming some of the disadvantages normally associated therewith.

Still another object of the present invention is to provide a new and improved thermostatic control system for rental unit properties.

Yet another object of the present invention is to provide a new and improved system for economically controlling temperature conditions within areas which may successively be occupied or vacant for substantial periods of time.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
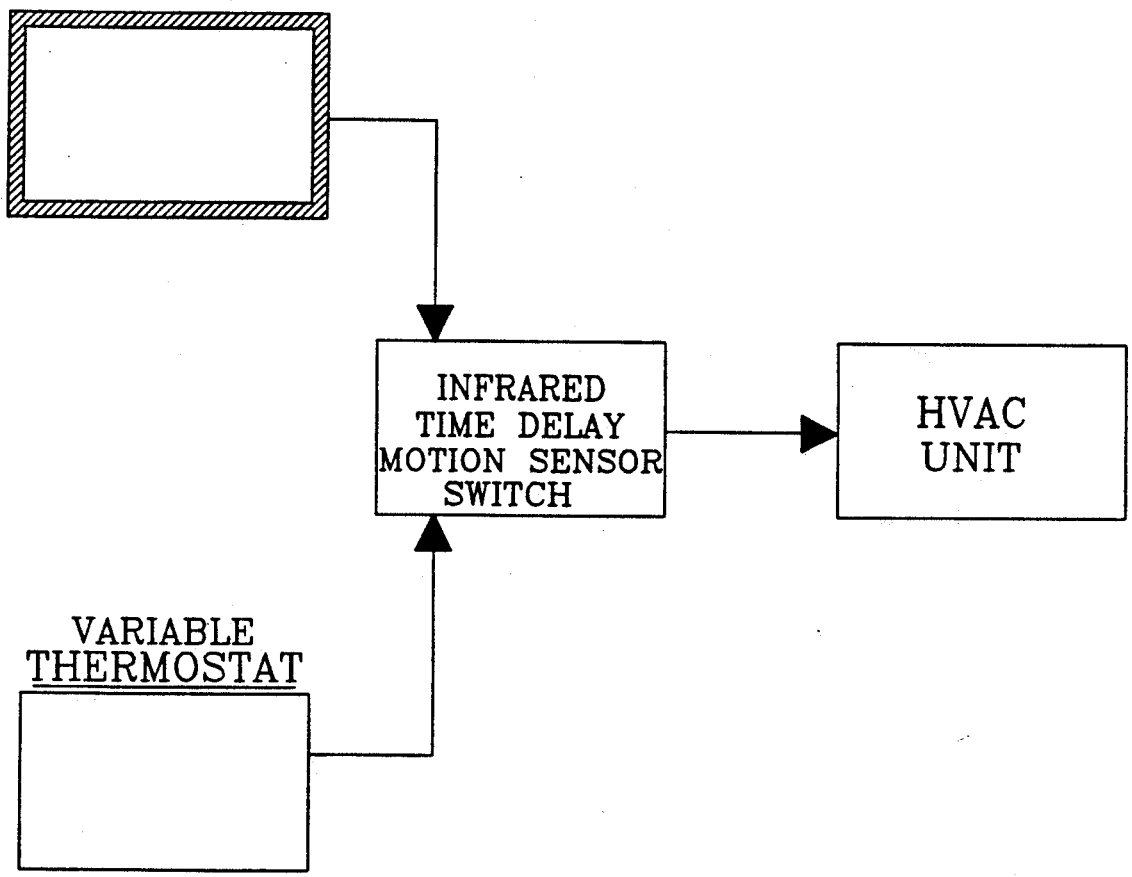
FIG. 1 is a flow sheet illustrating the basic concepts of the present invention.

With reference now to the drawings, and in particular to FIG. 1 thereof, a new and improved thermostatic control system embodying the principles and concepts of the present invention is illustrated by a flow sheet on which the components are identified by legends thereon.

Figure 2:
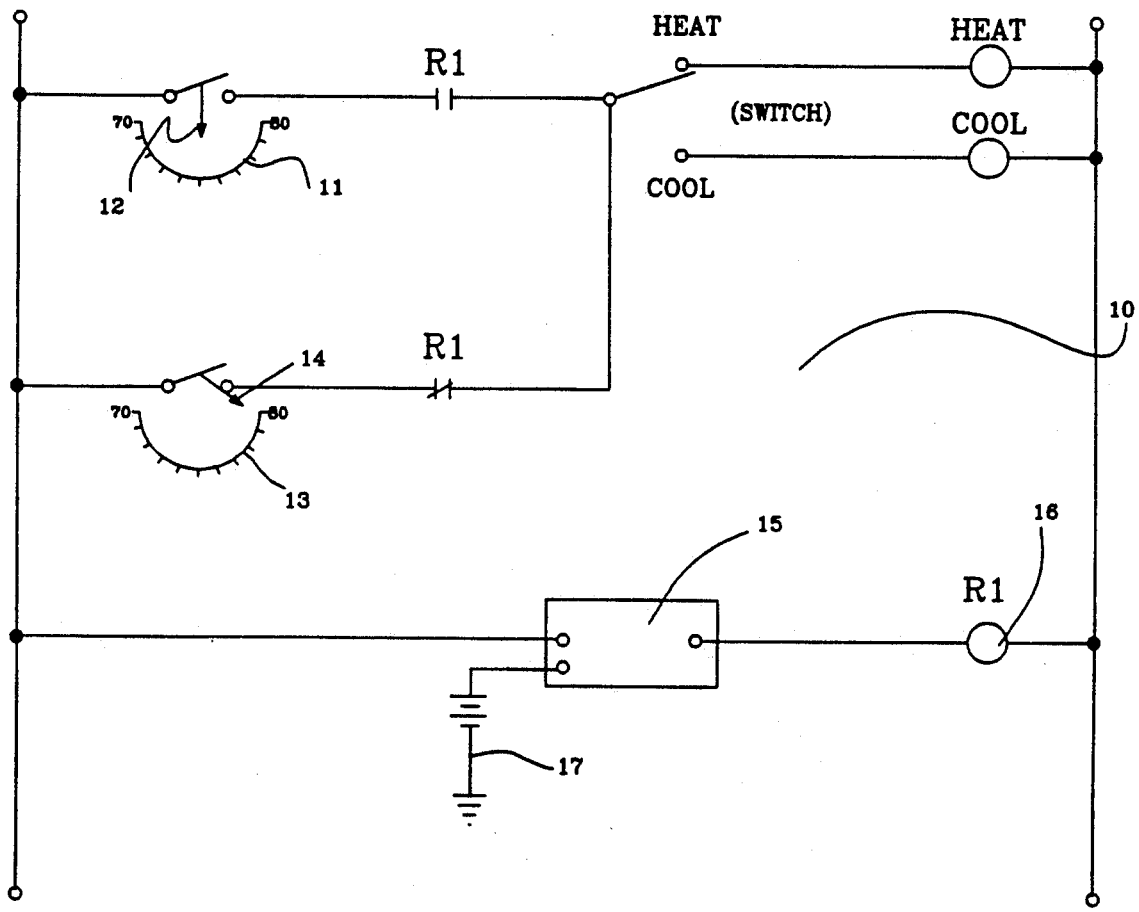
FIG. 2 is a schematic drawing illustrating the present invention.

More specifically, referring to FIG. 2 it will be noted that two thermostats are provided within the area 10 to be controlled. One thermostat 11 is fixed at a predetermined temperature setting by its control lever 12. Lever 12 is locked in position by means within the thermostat or, as illustrated in FIG. 1 by the cross-hatched lines surrounding the fixed thermostat, by encasing the thermostat within a locked box. The setting on thermostat 11 is hence changeable only by authorized personnel. The second thermostat 13 has a control lever 14 readily adjustable by an occupant of area 10. The two thermostatic units 11 and 13 are interconnected through a motion sensor 15 which contains therein a relay switch 16 designated "RI". In normal or unoccupied status of area 10, thermostat 11 is activated by relay switch RI and becomes the controller of the ambient temperature within area 10, said relay switch having deactivated thermostat unit 13.

As illustrated in FIG. 2 the motion sensor 15 has detected motion within area 10 and relay switch 16 has operated to close the relay on thermostat 13 putting it in control of the area 10 as indicated by the slash line through relay RI adjacent thermostat 13. At the same time relay switch 16 has opened the relay RI adjacent thermostat 11 making it inoperative. Relay switch 16 is timed to keep RI for thermostat 13 in closed position for a predetermined interval once it has been activated. Upon expiration of such time, switch 16 will again operate, deactivating thermostatic unit 13 and reactivating unit 11.

A battery back-up 17 may be provided to power the system in case of line failure.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved thermostat control system for use with a heating and air conditioning unit, said thermostat control system comprising:

a first thermostat being electrically connectable to said heating and air conditioning unit and facilitating adjustable temperature control thereof, said first thermostat comprising a first control lever for facilitating an adjustment thereof, and a locking means for precluding a movement of said first control lever;

a second thermostat being electrically connectable to said heating and air conditioning unit and facilitating adjustable temperature control thereof, said second thermostat comprising a second control lever for facilitating an adjustment thereof;

a first relay means in electrical communication with said first thermostat for selectively allowing electrical communication between said first thermostat and said heating and air conditioning unit;

a second relay means in electrical communication with said second thermostat for selectively allowing electrical communication between said second thermostat and said heating and air conditioning unit;

an infrared motion detector;
and;

a timed relay switch in electrical communication with a power supply, said first relay means, said second relay means, and said infrared motion detector, whereby said timed relay switch may energize said first and second relays;

wherein said timed relay switch is operable to de-energize said first relay, thereby precluding electrical communication between said first thermostat and said heating and air conditioning unit, and energize said second relay, thereby allowing electrical communication between said second thermostat and said heating and air conditioning unit, upon a detection of motion by said infrared motion detection, and;

wherein said timed relay switch is further operable to de-energize said second relay, thereby precluding electrical communication between said second thermostat and said heating and air conditioning unit, and energize said first relay, thereby allowing electrical communication between said first thermostat and said heating and air conditioning unit, after a predetermined length of time following a detection of an absence of motion by said infrared motion detection.

2. The new and improved thermostat control system of claim 1, wherein said locking means comprises a lock fixedly secured to said first thermostat and said first control lever for securing a position thereof, and a key operable to selectively release said lock, thereby allowing a movement of said first control lever.

3. The new and improved thermostat control system of claim 1, wherein said locking means comprises a box enclosing said first thermostat, a lock fixedly secured to said box for precluding access to an interior of said box, and a key operable to selectively release said lock, thereby allowing access to said first thermostat.

4. The new and improved thermostat control system of claim 3, and further comprising at least one battery in electrical communication with said timed relay switch.

* * * * *